: 2,919,210
Patented Dec. 29, 1959

2,919,210

METHOD OF APPLYING GLASS FORMING METAL BORATES TO SURFACES

Bernard L. Steierman, Toledo, Ohio, assignor to Owens-Illinois Glass Company, a corporation of Ohio No Drawing. Application November 7, 1956
Serial No. 620,791

4 Claims. (Cl. 117—123)

This invention relates to an improved process for uniting molten glass-forming metal borates to various types of solid surfaces.

The molten glass-forming metal borate glasses and enamels formed therefrom are well-known materials in the glass industry, and are possessed of at least one property which is highly desirable, namely, the relatively low melting characteristic thereof. This low melting and low fusing temperature characteristic has suggested that the metal borate glasses would be well suited for application to, or uniting with, conventional high melting glasses, metals, and minerals. However, their potential in this regard has been severely restricted by reason of the fact that these metal borate glasses are possessed of extremely high surface tension. This latter characteristic manifests itself in the formation of discrete droplets of the metal borate glass when an attempt is made to apply the molten metal borate glass in the form of an enamel on the surfaces of metals such as iron, nickel, tungsten, and the noble metals, etc., on the surfaces of conventional glasses having higher melting points than the metal borate glasses, or on minerals or ceramics, such as mica. The droplets are formed even though the metal borate glass in the form of an enamel has been spread out in an even coating on the surface to which applied. This characteristic of forming droplets, which is also evidenced in less severe situations by the formation of discontinuous films, is quite commonly referred to in the art as the inability of the metal borate glass to "wet" the surface of the substrate. Obviously, this non-wetting property of the metal borate glasses is highly undesirable, and tends to cause not only droplet formation or discontinuous films, but may also tend to result in a weak bond at the limited areas where the metal borate glass is in contact with the substrate.

Accordingly, it is an object of this invention to provide a method for inducting wetting action between a metal borate glass and a solid surface.

A further object of this invention is to provide such a method which provides a continuous and uniform coating or film of a metal borate glass on the surface of a substrate.

A particular object of this invention is to provide an improved method for uniting a molten metal borate glass with a solid surface by carrying out the contact of the metal borate glass with said surface in a highly oxidizing atmosphere.

Further and more specific objects of this invention are readily apparent from the more detailed description and specific examples to follow.

Generally speaking, this invention constitutes the discovery that the wetting properties of a molten glass-forming metal borate may be substantially increased by carrying out the application or coating operation in a strongly oxidizing atmosphere. More specifically, it has been found that a lead borate glass enamel may be applied as a continuous coating or film to a variety of solid surfaces, such as metals, other glasses, or minerals by applying the molten lead borate glass enamel to the solid surface in a pure or substantially pure atmosphere of oxygen. While it is not essential that a 100% oxygen atmosphere be employed, it is necessary that the atmosphere be definitely oxidizing in character, inasmuch as even a weakly oxidizing atmosphere will inhibit the wetting action and result in the formation of discrete droplets or a discontinuous film instead of a uniform film.

Another example of this application of the method of this invention is demonstrated by the preparation of an electrical insulating material similar to that sold under the trade name "Mycalex," which constitutes a rigid, solid composition of ground mica and a lead borate glass. In the preparation of a material of this type, it is often desirable to utilize synthetic mica. However, it has been found that the lead borate glass wets the synthetic mica to an insufficient degree, and the resulting product is quite heterogeneous. In accordance with this invention, the synthetic mica and a lead borate glass cullet are intimately mixed and heated in a very highly oxidizing atmosphere, such as provided by pure oxygen. The molten lead borate glass formed on heating is found to readily wet the surfaces of the particulate synthetic mica, and results, on cooling, in a product characterized by having a much greater degree of homogeneity, and, consequently, possessed of improved and more uniform properties.

A still further application of this invention is found in the establishment of a coating of the so-called "solder glasses" to higher melting point glasses. These solder glasses contain a high proportion of metal borates (particularly lead borate), and have melting points substantially below that of the glasses to which they are desirably united. The wetting and bonding of such solder glasses to the higher melting temperature glasses can be substantially improved by carrying out the application of the solder glass in an oxidizing atmosphere.

As many apparently widely different embodiments of this invention may be made without departing from the spirit and scope thereof, it is to be understood that the invention is not limited to the specific embodiment thereof, except as defined in the appended claims.

I claim:

1. In the process of effecting a bond between a solder glass, which comprises a major proportion of a metal borate, and a solid substrate selected from the group consisting of mica and a glass having a melting point greater than the said solder glass, wherein the said solder glass and substrate are brought into contact and heated above the melting point of the solder glass to fuse the solder glass to the substrate, the improvement which comprises the step of providing a substantially pure atmosphere of oxygen during the contacting and heating of said solder glass with the substrate whereby discrete droplet formation of said solder glass is avoided and a continuous coating of solder glass is bonded to said substrate.

2. The process of claim 1 wherein the substrate is glass.

3. The process of claim 1 wherein the substrate is mica.

4. In the process of effecting a bond between a molten glass-forming metal borate and a solid substrate selected from the group consisting of mica and a glass having a melting point greater than said glass-forming metal borate, wherein the said borate and substrate are brought into contact and heated above the melting point of the borate to fuse the borate to the substrate, the improvement which comprises the step of providing a substantially pure atmosphere of oxygen during the contacting and heating of said glass-forming metal borate with the substrate whereby discrete droplet formation of said borate is avoided and a continuous coating of said borate is bonded to said substrate.

(References on following page)

References Cited in the file of this patent

UNITED STATES PATENTS

| | | |
|---|---|---|
| 331,104 | Winslow | Nov. 24, 1885 |
| 460,358 | Buttler | Sept. 29, 1891 |
| 660,533 | Parr et al. | Oct. 23, 1900 |
| 1,105,251 | Carnahan | July 28, 1914 |
| 2,301,741 | Morris | Nov. 10, 1942 |
| 2,723,205 | Gallup | Nov. 9, 1955 |
| 2,724,662 | Andrews et al. | Nov. 22, 1955 |

FOREIGN PATENTS

| | | |
|---|---|---|
| 539,710 | Great Britain | Sept. 22, 1941 |